(12) United States Patent
Jacobs-Hattwig et al.

(10) Patent No.: US 6,762,265 B1
(45) Date of Patent: Jul. 13, 2004

(54) MICROSTRUCTURED COMPONENTS

(75) Inventors: Alexandra Jacobs-Hattwig, Niedernhausen (DE); Klaus Berger, Sulzbach (DE); Dirk Sabbert, Braunschweig-Dibbesdorf (DE); Jörg Landsiedel, Vacha (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/958,228

(22) PCT Filed: Mar. 20, 2000

(86) PCT No.: PCT/EP00/02449

§ 371 (c)(1), (2), (4) Date: Oct. 31, 2002

(87) PCT Pub. No.: WO00/61656

PCT Pub. Date: Oct. 19, 2000

(30) Foreign Application Priority Data

Apr. 8, 1999 (DE) ......................... 199 15 715

(51) Int. Cl.[7] ............................... C08F 36/00
(52) U.S. Cl. ................ 526/281; 526/282; 526/308; 219/121.6
(58) Field of Search .............................. 526/281, 282, 526/308; 219/121.6

(56) References Cited

U.S. PATENT DOCUMENTS

| | | | | |
|---|---|---|---|---|
| 5,498,677 A | * | 3/1996 | Weller et al. | 526/133 |
| 5,529,813 A | * | 6/1996 | Kobsa et al. | 427/517 |
| 5,583,192 A | | 12/1996 | Bennett et al. | 526/348.1 |
| 6,008,298 A | | 12/1999 | Hatke et al. | 525/210 |
| 6,270,869 B1 | | 8/2001 | Zeiter et al. | 428/35.8 |

FOREIGN PATENT DOCUMENTS

| | | |
|---|---|---|
| DE | 4328133 | 3/1994 |
| DE | 19 450 356 | 5/1997 |
| EP | 649737 | 4/1995 |
| EP | 824067 | 2/1998 |
| EP | 968816 | 1/2000 |
| EP | 968818 | 1/2000 |
| EP | 968819 | 1/2000 |
| EP | 1005977 | 6/2000 |
| WO | 96/33839 | 10/1996 |
| WO | 00/00399 | 1/2000 |
| WO | 00/61370 | 10/2000 |

OTHER PUBLICATIONS

Chang, T–C., et al, "Excimer Pulsed Laser Ablation of Polymers in Air and Liquids for Micromachining Applications," J. of Manufacturing Processes 1:1–17 (1999).

Naito Takahiro, "Moistureproof Multilayered Injection Molded Article" *Pat. Abs. of Japan 1995: No. 10,* Abstract of JP 07 171858 (Toppan Printing Co. Ltd) (Jul. 11, 1995).

Otsuka Yoshiaki, Multilayer Plastic Container with Good Preservative Property, *Pat. Abs. of Japan 1998: No. 01,* Abstract of JP 09 239909 (Kishimoto Akira) (Sep. 16, 1997).

Maruhashi Kichiji, "Multilayer Plastic Container and its Manufacture" *Pat. Abs. of Japan 1998,: No. 08,* Abstract of JP 10 059343 (Kishimoto Akira) (Mar. 3, 1998).

Derwent Abstract of published Japanese Appln. JP 09 011416 A, (Kishimoto A), XP–002142008, "Fragrance preserve multilayer container comprise inner outer layer olefinic resin middle layer amorphous olefin copolymer," (Jan. 14, 1997).

* cited by examiner

*Primary Examiner*—William Cheung
(74) *Attorney, Agent, or Firm*—Connolly Bove Lodge & Hutz LLP

(57) ABSTRACT

The invention relates to microstructured components comprising at least one cycloolefin copolymer, to a process for producing these microstructured components, and also to the use of these microstructured components.

11 Claims, No Drawings

MICROSTRUCTURED COMPONENTS

The present invention relates to microstructured components comprising at least one cycloolefin copolymer, to a process for producing these microstructured components, and also to the use of these microstructured components.

DD-A-211 801 and DD-A-211 802 disclose processes for modifying the surface properties of olefin copolymers as semifinished parts and molding materials. The semifinished parts and molding materials comprise ethylene-norbornene copolymer or a combination of ethylene-norbornene copolymer with thermoplastics, fillers, reinforcing materials and plastics auxiliaries. The modification is carried out by treatment with ionizing radiation or by chemical etching. The treatment achieves an improvement in the bondability, printability, metallizability and adhesion of surface coatings to the surface of the semifinished part or molding material. The treatment is carried out at a temperature of from 340 K to 410 K.

It is known from US-A-5,334,424 that the surface roughness of articles based on saturated norbornene resins can be reduced to <0.05 μm by polishing.

Journal of Photopolymer Science and Technology, Volume 10, No. 2 (1997) 159–166, describes processes based on the interaction of laser radiation with polymers.

Y. Nakayama, T. Matsuda in J. Biomed. Res., 29, 1295 (1995) disclose rates of removal of material at an energy flux of 1 J/cm² using excimer lasers.

It is an object of the present invention to provide microstructured components having a very finely gradated height profile and a very low surface roughness and also to provide an economical and environmentally friendly process for producing microstructured components. For the purposes of the invention, microstructured components are components which have structures in the micron range and below.

The object of the present invention is achieved by microstructured components comprising cycloolefin copolymers.

The microstructured components of the invention comprise at least one cycloolefin copolymer which comprises polymerized units derived from at least one cyclic, in particular polycyclic, olefin and optionally at least one acyclic olefin. The term cycloolefin polymer encompasses both cycloolefin copolymers and cycloolefin homopolymers.

The microstructured components of the invention comprise at least one cycloolefin copolymer comprising from 0.1 to 100% by weight, preferably from 0.1 to 99.9% by weight, based on the total mass of the cycloolefin copolymer, of polymerized units derived from at least one polycyclic olefin of the formula I, II, II', III, IV, V or VI

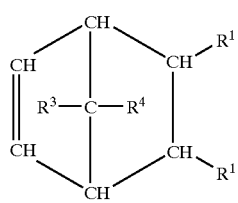

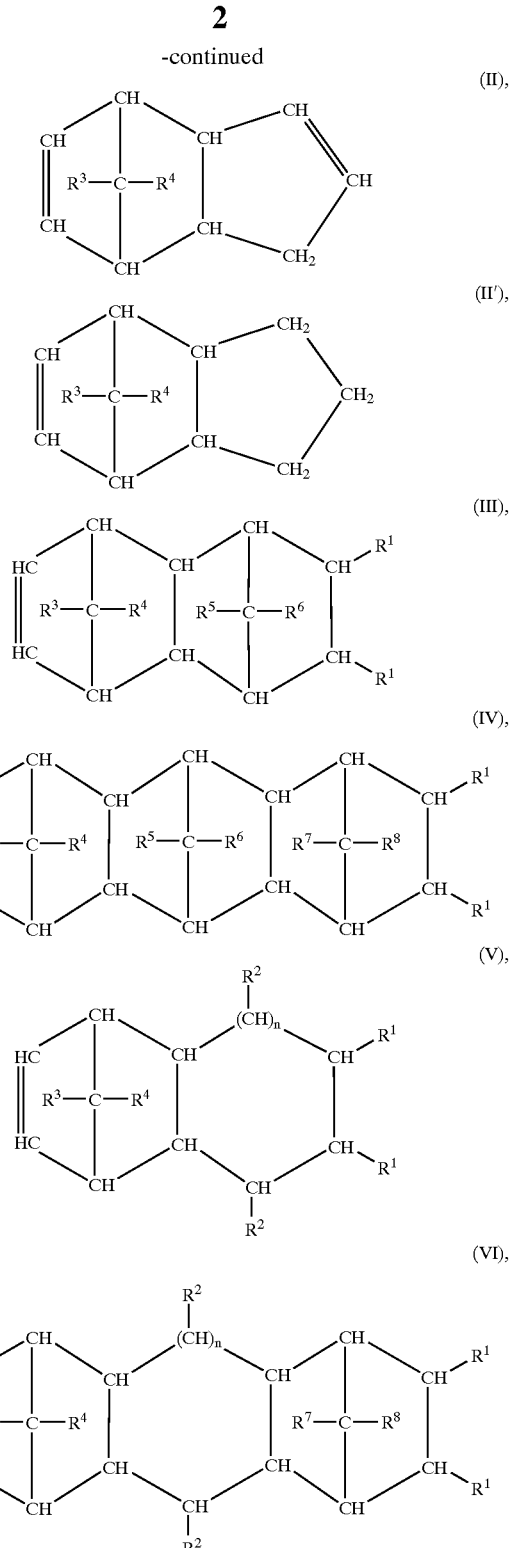

where $R^1$, $R^2$, $R^3$, $R^4$, $R^5$, $R^6$, $R^7$ and $R^8$ are identical or different and are each a hydrogen atom or a $C_1$–$C_{20}$-hydrocarbon radical such as a linear or branched $C_1$–$C_8$-alkyl radical, a $C_6$–$C_{18}$-aryl radical, a $C_7$–$C_{20}$-alkylenearyl radical, a cyclic or acyclic $C_2$–$C_{20}$-alkenyl radical or form a saturated, unsaturated or aromatic ring, where identical radicals $R^1$ to $R^8$ in the various formulae I to VI may have different meanings, and n can be from 0 to 5, and from 0 to 99.9% by weight, preferably from 0.1 to 99.9% by weight, based on the total mass of the cycloolefin copolymer, of polymerized units derived from one or more acyclic olefins of the formula VII

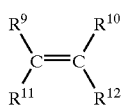

(VII), where $R^9$, $R^{10}$, $R^{11}$ and $R^{12}$ are identical or different and are each a hydrogen atom, a linear, branched, saturated or unsaturated $C_1$–$C_{20}$-hydrocarbon radical such as a $C_1$–$C_8$-alkyl radical or a $C_6$–$C_{18}$-aryl radical.

In addition, the cycloolefin copolymers used according to the invention for microstructured components may comprise from 0 to 45% by weight, based on the total mass of the cycloolefin copolymer, of polymerized units derived from one or more monocyclic olefins of the formula VIII

(VIII)

where m is from 2 to 10.

For the purposes of the invention, preference is given to cycloolefin copolymers which comprise polymerized units derived from polycyclic olefins of the formula I or III and polymerized units derived from acyclic olefins of the formula VII.

Particular preference is given to cycloolefin copolymers which comprise polymerized units derived from olefins having a norbornene skeleton, very particularly preferably derived from norbornene and tetracyclododecene and, if desired, vinylnorbornene or norbornadiene. Particular preference is also given to cycloolefin copolymers which comprise polymerized units derived from acyclic olefins having terminal double bonds, e.g. α-olefins having from 2 to 20 carbon atoms, very particularly preferably ethylene or propylene. Exceptional preference is given to norbornene/ethylene and tetracyclododecene/ethylene copolymers.

The cycloolefin copolymers used according to the invention can be prepared at temperatures of from −78 to 200° C. and a pressure of from 0.01 to 200 bar in the presence of one or more catalyst systems comprising at least one transition metal compound and optionally a cocatalyst and optionally a support material. Suitable transition metal compounds are metallocenes, in particular stereorigid metallocenes. Examples of catalyst systems which are suitable for preparing the cycloolefin copolymers used according to the invention are described in EP-A407 870, EP-A485 893 and EP-A-503 422. These references are hereby expressly incorporated by reference.

Examples of transition metal compounds used are:
rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylsilylbis(1-indenyl)zirconium dichloride,
rac-ethylene-1,2-bis(1-indenyl)zirconium dichloride,
dimethylsilyl-(9-fluorenyl)(cyclopentadienyl)zirconium dichloride,
diphenylsilyl-(9-fluorenyl)(cyclopentadienyl)zirconium dichloride,
bis(1-indenyl)zirconium dichloride,
diphenylmethylene-(9-fluorenyl)cyclopentadienylzirconium dichloride,
isopropylene-(9-fluorenyl)cyclopentadienylzirconium dichloride,
rac-isopropylidenebis(1-indenyl)zirconium dichloride,
phenylmethylmethylene-(9-fluorenyl)cyclopentadienylzirconium dichloride,
isopropylene-(9-fluorenyl)(1-(3-isopropyl)cyclopentadienyl)zirconium dichloride,
isopropylene-(9-fluorenyl)(1-(3-methyl)cyclopentadienyl)zirconium dichloride,
diphenylmethylene-(9-fluorenyl)(1-(3-methyl)cyclopentadienyl)zirconium dichloride,
methyl phenylmethylene(9-fluorenyl)(1-(3-methyl)cyclopentadienyl)zirconium dichloride,
dimethylsilyl-(9-fluorenyl)(1-(3-methyl)cyclopentadienyl)zirconium dichloride,
diphenylsilyl-(9-fluorenyl)(1-(3-methyl)cyclopentadienyl)zirconium dichloride,
diphenylmethylene-(9-fluorenyl)(1-(3-tert-butyl)cyclopentadienyl)zirconium dichloride,
isopropylene-(9-fluorenyl)(1-(3-tert-butyl)cyclopentadienyl)zirconium dichloride,
isopropylene(cyclopentadienyl)(1-indenyl)zirconium dichloride,
diphenylcarbonyl(cyclopentadienyl)(1-indenyl)zirconium dichloride,
dimethylsilyl(cyclopentadienyl)(1-indenyl)zirconium dichloride,
isopropylene(methylcyclopentadienyl)(1-indenyl)zirconium dichloride,
4-($\eta^5$-cyclopentadienyl)4,7,7-trimethyl-($\eta^5$-4,5,6,7-tetrahydroindenyl)zirconium dichloride,
[4-($\eta^5$-cyclopentadienyl)4,7,7-triphenyl-($\eta^5$-4,5,6,7-tetrahydroindenyl)]zirconium dichloride,
[4-($\eta^5$-cyclopentadienyl)-4,7-dimethyl-7-phenyl-($\eta^5$-4,5,6,7-tetrahydroindenyl)]zirconium dichloride,
[4-($\eta^5$-3'-tert-butylcyclopentadienyl)-4,7,7-triphenyl-($\eta^5$-4,5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)4,7,7-trimethyl-($\eta^5$-4,5,6,7-tetrahydro-indenyl)]zirconium dichloride, 5
[4-($\eta^5$-3'-methylcyclopentadienyl)-4,7,7-triphenyl-($\eta^5$-4,5,6,7-tetrahydro-indenyl)]zirconium dichloride, 5
[4-($\eta^5$-3'-methylcyclopentadienyl)-4,7-dimethyl-7-phenyl-($\eta^5$-4,5,6,7-tetrahydroindenyl)]zirconium dichloride,
[4-($\eta^5$-3'-isopropylcyclopentadienyl)4,7,7-trimethyl-($\eta^5$-4,5,6,7-tetrahydro-indenyl)]zirconium dichloride,
[4($\eta^5$-3'-isopropylcyclopentadienyl)-4,7,7-triphenyl-($\eta^5$-4,5,6,7-tetrahydro-indenyl)]zirconium dichloride,
[4-($\eta^5$-3'-isopropylcyclopentadienyl)4,7-dimethyl-7-phenyl-($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl-($\eta^5$-4,5-tetrahydropentalene)]zirconium dichloride,
[4-($\eta^5$-5-cyclopentadienyl)4-phenyl-($\eta^5$-4,5-tetrahydropentalene)]zirconium dichloride,
[4-($\eta^5$-cyclopentadienyl)4-phenyl-($\eta^5$-4,5-tetrahydropentalene)]zirconium dichloride,
[4-($\eta^5$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,

[4-(η⁵-3'-benzylcyclopentadienyl)(η⁵-4,5-tetrahydropentalene)]zirconium dichloride,
[2,2,4-trimethyl-4-(η⁵-cyclopentadienyl)(η⁵-4,5-tetrahydropentalene)]-zirconium dichloride,
[2,2,4-trimethyl4-(η⁵-(3,4-diisopropyl)cyclopentadienyl)(η⁵-4,5-tetrahydropentalene)]zirconium dichloride.

The cycloolefin copolymers are prepared by means of heterogeneous or homogeneous catalysis using organometallic compounds and is described in many patents. Catalyst systems based on mixed catalysts comprising titanium salts and organoaluminum compounds are described in DD-A-109224 and DD-A-237 070. EP-A-156 464 describes the preparation of copolymers using catalysts based on vanadium. EP-A-283 164, EP-A-407 870, EP-A-485 893 and EP-A-503 422 describe the preparation of cycloolefin polymers using catalysts based on soluble metallocene complexes. For the preparative methods and catalyst systems described in these patents for the preparation of cycloolefin copolymers are hereby expressly incorporated by reference.

The cycloolefin copolymers used according to the invention can be prepared by homopolymerization and/or copolymerization of cyclic, preferably polycyclic olefins with retention of the rings.

The cycloolefin copolymers can also be prepared by ring-opening polymerization of at least one of the monomers of the formulae I to VI and subsequent hydrogenation of the products obtained. If desired, the cycloolefin copolymers can also be prepared by ring-opening copolymerization of at least one of the monomers of the formulae I to VI with further monomers, e.g. monocyclic monomers of the formula VIII, and subsequent hydrogenation of the products obtained. The preparation of cycloolefin copolymers is described in the Japanese patents 3-14882, 3-122137, 4-63807, 2-27424 and 2-276842. The preparative methods and catalyst systems described in these patents for the preparation of cycloolefin copolymers are hereby expressly incorporated by reference. Derivatives of these cyclic olefins containing polar groups such as halogen, hydroxyl, ester, alkoxy, carboxy, cyano, amido, imido or silyl groups are likewise included.

The polymerization can also be carried out in a number of stages, in which case block copolymers can also be formed (DE-A42 05 416).

Cycloolefin copolymers are preferably amorphous, transparent materials. The heat distortion resistances of the cycloolefin copolymers can be set within a wide range. The glass transition temperature of cycloolefin copolymers can be employed as an indication of the heat distortion resistance as can be determined on injection-molded specimens in accordance with ISO 75 part 1 and part 2. The cycloolefin copolymers described have glass transition temperatures in the range from –50 to 220° C. Preference is given to glass transition temperatures in the range from 0 to 180° C., particularly preferably from 40 to 180° C.

The mean molar mass of the cycloolefin copolymers can be controlled in a known manner by introduction of hydrogen, variation of the catalyst concentration or variation of the temperature. The cycloolefin copolymers present in the microstructured components of the invention have mass average molar masses $M_w$ in the range from 1 000 to 10 000 000 g/mol. Preference is given to mass average molar masses $M_w$ in the range from 5 000 to 5 000 000 g/mol, particularly preferably from 10 000 to 1 200 000 g/mol.

The cycloolefin copolymers present in the microstructured components of the invention have viscosity numbers in the range from 5 to 1 000 ml/g. Preference is given to viscosity numbers in the range from 20 to 500 ml/g, particularly preferably from 30 to 300 ml/g.

The microstructured components of the invention may also comprise blends of at least one cycloolefin copolymer and at least one further polymer in any mixing ratios.

Preference is given to using the following polymers for the blends with cycloolefin copolymers:
polyethylene, polypropylene, ethylene-propylene copolymers, polybutylene, poly(4-methyl-1-pentene), polyisoprene, polyisobutylene, natural rubber, poly(1-methylene methacrylate), further polymethacrylates, polyacrylate, acrylate-methacrylate copolymers, polystyrene, styrene-acrylonitrile copolymer, bisphenol A polycarbonate, further polycarbonates, aromatic polyester carbonates, polyethylene terephthalate, polybutylene terephthalate, amorphous polyacrylate, nylon 6, nylon 66, further polyamides, polyaramids, polyether ketones, polyoxymethylene, polyoxyethylene, polyurethanes, polysulfones, polyether sulfones, polyvinylidene fluoride.

For blends of cycloolefin copolymers and polyolefins, preference is given to using the following polyolefins: homopolymers of ethylene and propylene and copolymers of these two monomers, copolymers based on ethylene and linear or branched olefins such as butene, pentene, hexene, heptene, octene, nonene, decene, undecene and dodecene, copolymers based on propylene and linear or branched olefins such as butene, pentene, hexene, heptene, octene, nonene, decene, undecene and dodecene, terpolymers of ethylene, propylene and linear or branched olefins such as butene, pentene, hexene, heptene, octene, nonene, decene, undecene and dodecene.

The blends can be produced by customary methods, e.g. by coextrusion of the polymer components from the melt, if desired using further additives, and subsequent granulation.

Cycloolefin copolymers can be processed from the melt or from solution. Suitable solvents are aprotic nonpolar hydrocarbons such as decaline or mixtures of linear and branched hydrocarbons.

The production of the microstructured components of the invention can be carried out by production of the actual component and simultaneous microstructuring, e.g. by thermoplastic processing methods such as injection molding. Also suitable for this purpose is the LIGA process, viz. a combination of lithography, electroforming and molding for producing such microstructured components. Another possibility is microstructuring of the prefabricated component, e.g. by etching processes such as wet chemical etching or dry etching processes, by embossing processes such as hot embossing, by material working by means of laser radiation such as laser ablation using excimer lasers or microwelding, by methods of precision machining such as cutting machining or spark erosion or by photolithography.

It has surprisingly been found that cycloolefin copolymers display particularly low rates of material removal in the production of the microstructured components of the invention by laser ablation. Cycloolefin copolymers are thus surprisingly particularly suitable for microstructured components having very fine profiles. Cycloolefin copolymers are very particularly useful for microstructured components having profiles whose height differences are less than 500 nm.

An important parameter for micromechanical applications is the wall angle α of the ablated structure. The angle is designated as positive when the area at the bottom of the depression produced is smaller than the area at the surface, and as negative when the circumstances are reversed. Vertical walls are of particular importance in microstructuring. However, positive wall angles are also required since positive wall angles a aid removal from the mold in the replication processes following electroforming.

It has surprisingly been found that cycloolefin copolymers are particularly suitable for microstructured components since both wall angles α=0 and positive wall angles can be obtained by selection of appropriate production conditions. Here, cycloolefin copolymers are likewise distinguished from other materials such as PMMA.

The laser ablation of cycloolefin polymers is preferably carried out by means of laser radiation having an energy density of greater than or equal to 1.0 J/cm$^2$, particularly preferably an energy density of greater than or equal to 1.5 J/cm$^2$. To these energy densities, the ablation rate per laser pulse is in the saturation region, i.e. the maximum ablation per laser pulse is achieved. Laser ablation in the saturation region has the advantage that, particularly in the case of energy densities greater than or equal to 1.0 J/cm$^2$, the ablation results achieved are very reproducible and, particularly at energy densities greater than or equal to 1.5 J/cm$^2$, structures having vertical walls are achieved. Low ablation rates can likewise be obtained in laser ablation of conventional polymeric materials such as PMMA, but it is necessary to employ energy densities significantly below the saturation region. This leads to comparatively poorly reproducible ablation results, and also to structures having inclined walls.

In short-wave ultraviolet irradiation of a polymeric material, material is removed from the surface above a critical energy density as a result of photoinduced and thermal decomposition. In laser ablation of cycloolefin polymers, preference is given to using laser radiation having a wavelength of less than or equal to 350 nm. A certain proportion of the ablated material is redeposited on the surface; this material is known as debris.

Microstructured components according to the invention which have been produced by laser ablation surprisingly displayed virtually no debris on examination under a scanning electron microscope and an optical microscope as long as the holes produced had a gap of less than 200 μm. Only in the case of deeper structures were particles having a diameter of less than 100 nm observed in the vicinity of the structures produced. The surface roughness of the microstructured components of the invention is comparatively low, especially on the walls of the structure.

The components produced according to the invention display greatly improved use properties such as low density, high transparency to <300 nm, a high Abbe number, low double refraction, extraordinarily low water absorption, excellent barrier action against water vapor, gradated heat distortion resistance (HDT/B) up to 170° C., high stiffness, strength and hardness, little aging under the action of heat or high-energy radiation, good blood compatibility, excellent biocompatibility, good sterilizability by means of hot steam, hot air, ethylene oxide gas and high-energy radiation (gamma radiation and electron beam), very good electrical insulation properties, high resistance to acids, alkalis and polar solvents, good decolorizability and very good thermoplastic processability/flow. Due to the high chemical purity, the microstructured components of the invention are very suitable for applications in microoptics or diffraction optics and for medical and biotechnical components or apparatuses such as capillary electrophoresis. For such applications, the microstructured component has at least one microoptical structure such as a microlens, wave guide or diffraction grating, or at least one fluid-conducting structure such as a capillary channel, sill structure, reaction chamber, mixing structure or filter structure.

Cycloolefin polymers are therefore very particularly suitable for the production of microstructured bodies as prototypes which can be replicated by means of the laser-LIGA technique, cf. Arnold et al., Appl. Surface Sci. 86, 251 (1995). In this method, a layer of a polymer is microstructured by means of laser radiation, with precision machining and/or microengineering processing additionally being able to take place. After application of a thin metal layer to the microstructured surface, a metal or an alloy is electrodeposited in a sufficient thickness. The metallic body which has been deposited in this way can, optionally after surface working, be used as pattern for molding of microstructured bodies in large numbers, for example by means of injection molding using thermoplastic materials.

It has surprisingly been found that cycloolefin copolymers are particularly suitable for microstructured components having a very finely gradated height profile. Cycloolefin copolymers are very particularly useful for microstructured components having fine profiles whose height differences are less than 500 nm. This is of particular interest for the production of elements for diffraction optics whose properties improve with an increasing number of structuring steps. Cycloolefin copolymers are therefore highly suitable for the production of prototypes.

The microstructured components of the invention are suitable for many applications, e.g. in the automobile sector for sensors and regulating systems, in the information and communication sector for systems for optical data transmission and processing, e.g. couplers, connection elements, elements for branching beams and optical switches, for data storages, systems for moving image projection, microlenses, in the medical technology sector for diagnositic systems, atomization systems for inhalers, micropumps for infusion systems, various implants, systems for minimally invasive surgery and in the field of chemical process technology/biotechnology for microreactors, static mixers, pumps, metering systems, filtration systems, valves, etc.

The invention is illustrated by the following examples.

EXAMPLES

Example 1

Preparation of the Cycloolefin Copolymer

A 50% strength by weight solution of norbornene in Exxsol were placed in a 70 dm$^3$ autoclave which had previously been flushed with ethylene. The solution was saturated with ethylene by pressurizing the autoclave with ethylene a number of times. A solution of methylaluminoxane in toluene (10% strength by weight solution of methylaluminoxane having a molar mass of 1 300 g/mol according to cryoscopic determination) was introduced in countercurrent into the prepared reactor and the mixture was stirred at 70° C. for 30 minutes. A toluene solution of 100 mg of isopropylene-(cyclopentadienyl)(1-indenyl)zirconium dichloride was preactivated for 30 minutes and then added. Polymerization was carried out for one hour while stirring, with the ethylene pressure of 20 bar being kept constant by introduction of further amounts. The amount of hydrogen was 500 ppm. After the end of the reaction time, the polymer mixture was drained into a vessel and immediately introduced into 300 dm$^3$ of acetone and stirred for 30 minutes. The product which precipitated was subsequently filtered off. The filter cake was washed three times alternately with 10% strength hydrochloric acid and acetone. The residue was slurried in acetone and filtered again. The purified product was dried at 70° C. under reduced pressure (0.2 bar) for 24 hours. A colorless polymer having a viscosity number of 52 ml/g, a glass transition temperature of 134° C. and a mean molar mass Mw=30 000 g/mol was obtained. The polymer will hereinafter be referred to as COC1.

Example 2

Production of the microstructured components and determination of the ablation rate The production according to the invention of microstructured components was carried out using a commercial excimer laser forming unit (Exitech series 7000). The workstation was provided with beam homogenization optics and a reflecting Schwarzschild focusing assembly for imaging a square aperture. The numerical aperture was 0.28. The entire apparatus was computer controlled. An ArF excimer laser having a wavelength λ=193 nm from Lambda Physik LPX 100i was used. The ablation depth and the surface roughness of the structures produced as well as the wall angle were measured using a Wyco interferometer and a Leica optical microscope equipped with micrometer adjustment. The ablation sensitivity was determined by correlation of the ablation depth with the pulse number and the energy density. The proportion of redeposited material (debris) and its structure were determined qualitatively by means of a Leica optical microscope and a scanning electron microscope.

A 1 mm thick sheet was firstly produced from the COC1. A matrix of 80 square holes of the same type having dimensions of 300 μm*300 μm was formed in the sheet. Its square was irradiated with the excimer laser radiation at a variable number of pulses and energy density at a constant repetition rate of 10 Hz. The pulse time was about 17 ns. The number of pulses was 2, 5, 10, 20, 50, 100, 200, 500, 1 000 and 3 000. The energy densities were 0.2/0.4/0.6/0.8/1/1.2/1.4/1.8 J/cm$^2$. In this way, the following values for the ablation rate were obtained.

Comparative example 1

For comparison, a sample of polymethyl methacrylate (PMMA) was processed under conditions identical to those in example 2.

TABLE 1

| Example | Polymer substrate | Ablation rate at $\epsilon$ = 1 J/cm$^2$ [μm/pulse] |
|---|---|---|
| Example 2 | COC1 (cycloolefin copolymer) | 0.17 |
| Comparative example 1 | PMMA (polymethyl methacrylate) | 0.58 |

For both polymeric materials, an energy density above which no ablation occurs (ablation threshold) of about 0.05 J/cm$^2$ was measured.

Comparison between the material according to the invention as described in example 1 and the comparative sample of PMMA as described in comparative example 1 shows that, in the region of low energy density, the ablation rate per pulse increases very much less steeply with the energy flux in the case of COC1 than in the case of PMMA. The plateau value which represents the maximum ablation rate per pulse is reached only at higher energy densities above about 0.7 J/cm$^2$ for both COC1 and PMMA. As can be seen from table 1, the maximum ablation rate per pulse of 0.17 μm/pulse for COC1 is very much lower than the value of 0.58 μm/pulse in the case of PMMA.

Example 3

Determination of the wall angle α was carried out as described in example 2. In the case of COC1, the wall angle under the given experimental conditions is a function of the energy density: for low energy densities, α is positive and approaches zero at high energy densities. Vertical walls are therefore formed. Above an energy density of 1.5 J/cm$_2$, the wall angle becomes zero.

Examination showed that no distortion occurred at the corners and the walls of the holes produced were flat.

Comparative Example 2

For comparison, a sample of polymethyl methacrylate (PMMA) was processed under conditions identical to those in example 3. In contrast to example 3, negative wall angles are found here at relatively high energy densities.

Comparative values for PMMA: α=0° for ε=0.8 J/cm$^2$ and α=−1° for ε>0.8 J/cm$^2$

Example 4

Determination of Ablated Material and the Surface Roughness

Procedure as described in example 2. In the case of COC1, examination by means of the scanning electron microscope and the optical microscope showed virtually no debris if the holes produced had a depth of less than 200 μm. Only in the case of deeper structures were particles having a diameter of less than 100 nm observed in the vicinity of the structures produced.

Table 3 shows that low surface roughnesses are obtained when using COC in comparison with polymers used hitherto. PET (polyethylene terephthalate) PET (polyethylene terephthalate)

TABLE 2

| Polymer substrate | Maximum roughness (maximum height difference [nm] |
|---|---|
| COC1 (cycloolefin copolymer) | <190 |
| PC (polycarbonate) | 130 |
| PS (polystyrene) | 130 |
| PET (polyethylene terephthalate) | 390 |
| PMMA | 630 |
| Zeonex* | 250 |

Values from our own comparative measurements.

(*Zeonex: a cycloolefin polymer from Nippon Zeon Co. Ltd.)

The surface roughnesses of the microstructures of PC, PS and PET obtainable by optical methods were taken from Roberts et al., Anal. Chem., 69, 2035 (1997).

What is claimed is:

1. A process for producing microstructured components comprising as material at least one cycloolefin copolymer comprising 0.1–100% by weight, based on the total mass of the cycloolefin polymer, of polymerized units derived from at least one polycyclic olefin of the formula I, II, II', III, IV, V or VI

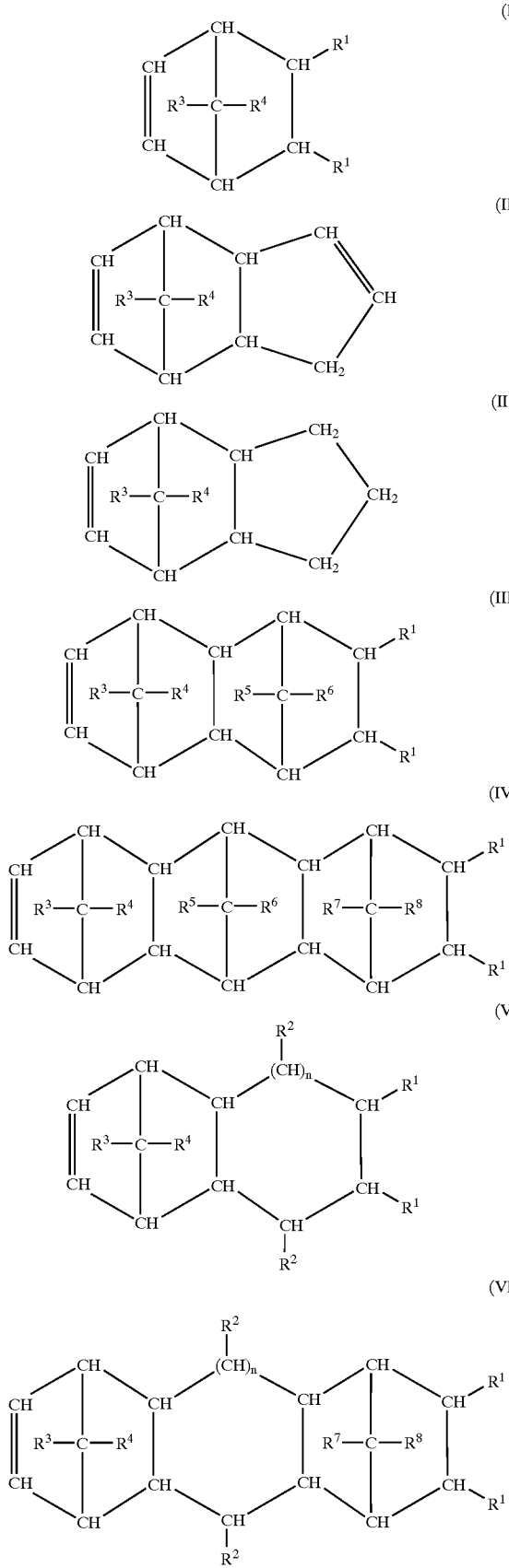

(I), (II), (II'), (III), (IV), (V), (VI), wherein $R^1$, $R^2$, $R^3$, $R^4$, $R^5$, $R^6$, $R^7$ and $R^8$ are identical or different and are each a hydrogen atom or a $C_1$–$C_{20}$-hydrocarbon radical wherein identical radicals $R^1$ to $R^8$ in the various formulae 1 to VI may have different meanings, and n is from 0 to 5, and from 0 to 99.9% by weight, based on the total mass of the cycloolefin copolymer, of polymerized units derived from one or more acyclic olefins of the formula VII

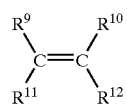

(VII), wherein $R^9$, $R^{10}$, $R^{11}$ and $R^{12}$ are identical or different and are each a hydrogen atom, a linear, branched, saturated or unsaturated $C_1$–$C_{20}$-hydrocarbon radical and from 0 to 45% by weight, based on the total composition of the cycloolefin copolymer, of polymerized units derived from one or more monocyclic olefins of the formula VIII

(VIII)

wherein m is from 2 to 10, and forming the microstructured components by means of laser radiation.

2. The process as claimed in claim 1, wherein said at least one cycloolefin copolymer is prepared by polymerization of polycyclic monomers with retention of the rings.

3. The process as claimed in claim 1, wherr in said at least one cycloolefin copolymer comprises 0.1–99.9% by weight, based on the total mass of the cycloolefin polymer, of polymerized units derived from at least one polycyclic olefin of the formula I, II, II', III, IV, V or VI and from 0 to 99.9% by weight, based on the total mass of the cycloolefin copolymer, of polymerized units derived from at least one acyclic olefin of the formula VII.

4. The process as claimed in claim 1, wherein said at least one cycloolefin copolymer comprises polymerized units derived from one or more polycyclic olefins of the formula I or III and from one or more α-olefins having from 2 to 20 carbon atoms.

5. The process as claimed in claim 1, wherein the cycloolefin copolymers are norbornene-ethylene or tetracyclodecene-ethylene copolymers.

6. The process as claimed in claim 1, wherein the laser radiation has a wavelength of less than or equal to 350 nm.

7. The process as claimed in claim 1, wherein the energy density of the laser radiation is set to greater than or equal to 1.1 J/cm$^2$.

8. The process as claimed in claim 1, wherein $R^1$, $R^2$, $R^3$, $R^4$, $R^5$, $R^6$, $R^7$ and $R^8$ are identical or different and are each a hydrogen atom, a linear or branch $C_1$–$C_8$ alkyl radical, a $C_6$–$C_{18}$ aryl radical, a $C_7$–$C_{20}$ alkylenearyl radical or a cyclic $C_2$–$C_{20}$ alkenyl radical or form a saturated or unsaturated or aromatic ring and wherein $R^9$, $R^{10}$, $R^{11}$, and $R^{12}$ are identical or different and are each a hydrogen atom, a linear, branched, saturated or unsaturated $C_1$–$C_8$ alkyl radical or a $C_6$–$C_{18}$ aryl radical.

9. The process as claimed in claim 1, wherein the energy density of the laser radiation is set to greater than or equal to 1.5 J/cm$^2$.

10. An article which comprises a microstructure component produced from the process as claimed in claim 1.

11. The article as claimed in claim 10 wherein the article is a sensor, coupler, a connecting element, an element for branching radiation beams, an element for optical switches, data storage, system removing image projection microlenses, atomizer system for inhalers, micropump for infusion systems, implant, static mixer, pump, metering system, filtration system and a valve.

* * * * *

UNITED STATES PATENT AND TRADEMARK OFFICE
CERTIFICATE OF CORRECTION

PATENT NO. : 6,762,265 B1  Page 1 of 1
DATED : July 13, 2004
INVENTOR(S) : Alexandra Jacobs –Hattwig et al.

It is certified that error appears in the above-identified patent and that said Letters Patent is hereby corrected as shown below:

Column 12,
Line 32, "wherr in" should read -- wherein --.

Signed and Sealed this

Thirty-first Day of August, 2004

JON W. DUDAS
*Director of the United States Patent and Trademark Office*